United States Patent [19]

Yamamoto et al.

[11] Patent Number: 5,184,212
[45] Date of Patent: Feb. 2, 1993

[54] CIRCUIT FOR PRODUCING BRIGHTNESS SIGNAL FROM OUTPUT SIGNAL OF SOLID STATE IMAGE PICK-UP APPARATUS USING SPATIAL PIXEL SHIFT

[75] Inventors: Kazumi Yamamoto, Yokohama; Masayuki Sugasawa, Tokyo, both of Japan

[73] Assignee: Ikegami Tsushinki Co., Ltd., Tokyo, Japan

[21] Appl. No.: 756,334

[22] Filed: Sep. 6, 1991

[30] Foreign Application Priority Data

Sep. 12, 1990 [JP] Japan .................. 2-240093

[51] Int. Cl.$^5$ .................... H04N 9/09
[52] U.S. Cl. ................... 358/39; 358/50
[58] Field of Search ................ 358/39, 50

[56] References Cited

U.S. PATENT DOCUMENTS

| | | | |
|---|---|---|---|
| 4,358,788 | 11/1982 | Burrowes | 358/39 |
| 4,490,738 | 12/1984 | Asaida | 358/50 |
| 4,506,294 | 3/1985 | Nagumo | 358/50 |
| 4,725,881 | 2/1988 | Buchwald | 358/50 |

FOREIGN PATENT DOCUMENTS

| | | |
|---|---|---|
| 58-10988 | 1/1983 | Japan . |
| 61-273092 | 12/1986 | Japan . |
| WO8505526 | 12/1985 | PCT Int'l Appl. . |
| WO9013977 | 11/1990 | PCT Int'l Appl. . |

OTHER PUBLICATIONS

"Wide Dynamic Range HDTV Image Sensor With Aliasing Suppression" Nishida et al., IEEE Transactions on Consumer Electronics, vol. 34, No. 3, Aug. 1988, pp. 506-511.

Primary Examiner—Howard W. Britton
Attorney, Agent, or Firm—Spencer, Frank & Schneider

[57] ABSTRACT

A circuit for producing a brightness signal from output color signals of a solid state image pick-up apparatus. The circuit comprises a delay circuit for delaying an output signal generated by one solid state image sensor by a delay time corresponding to one-half of a spatial sampling period so that the phase of the output signal of the one solid state image sensor is made to coincide with the phase of an output signal of another solid state image sensor. A first filter is provided for cutting off higher frequency components contained in the output signal of the delay circuit and in the output signal of the other solid state image sensor, and a signal processor is provided for processing output signals of the first filter. A first matrix adds output signals of the signal processor to each other at a predetermined ratio to produce a first brightness signal, and a second matrix adds the output signal of the delay circuit and the output signal of the other solid state image sensor to each other at a ratio of 1:1 to derive a second brightness signal. A second filter extracts a high frequency component from the second brightness signal, and an adder adds the high frequency component derived by the second filtering means to the first brightness signal.

11 Claims, 4 Drawing Sheets

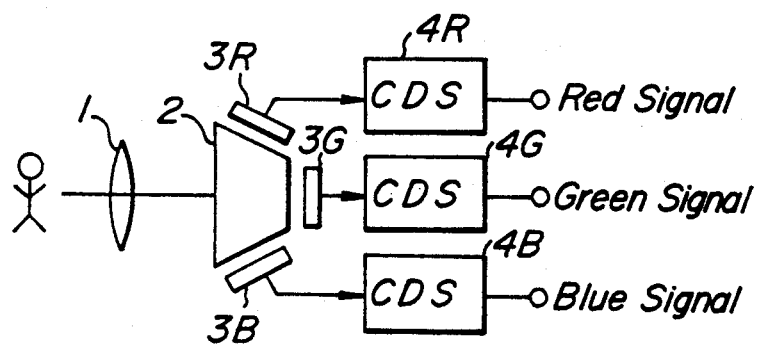
FIG_1A
PRIOR ART
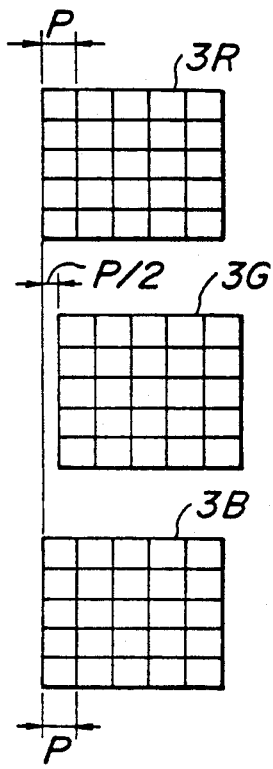
FIG_1B
PRIOR ART
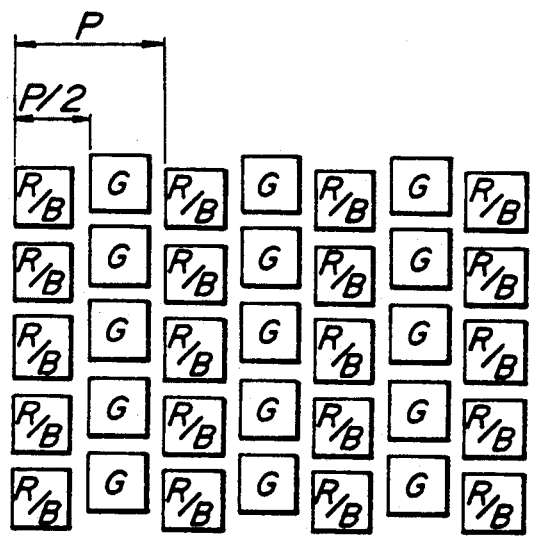
FIG_1C
PRIOR ART

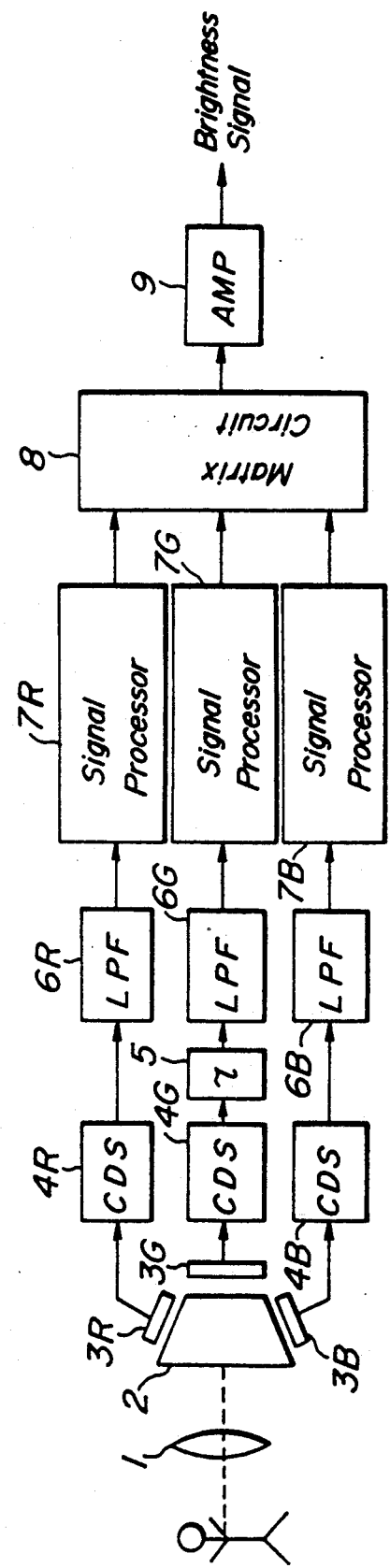
FIG._2 PRIOR ART

FIG_3A Pattern
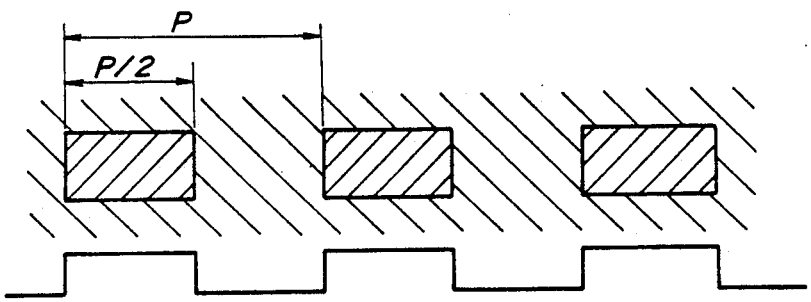
FIG_3B Clock
FIG_3C G
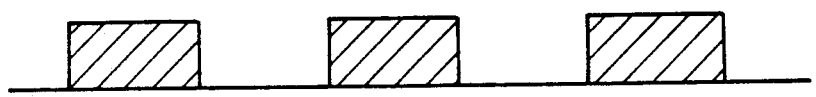
FIG_3D R/B
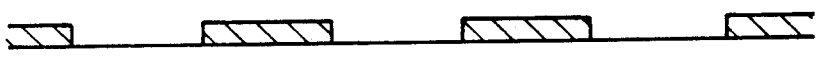
FIG_3E Y
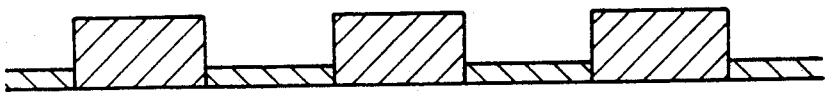
FIG_3F G'
FIG_3G R'/B'
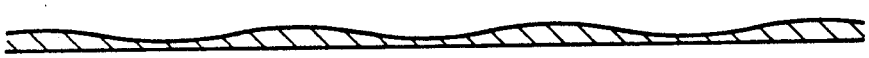
FIG_3H Y'

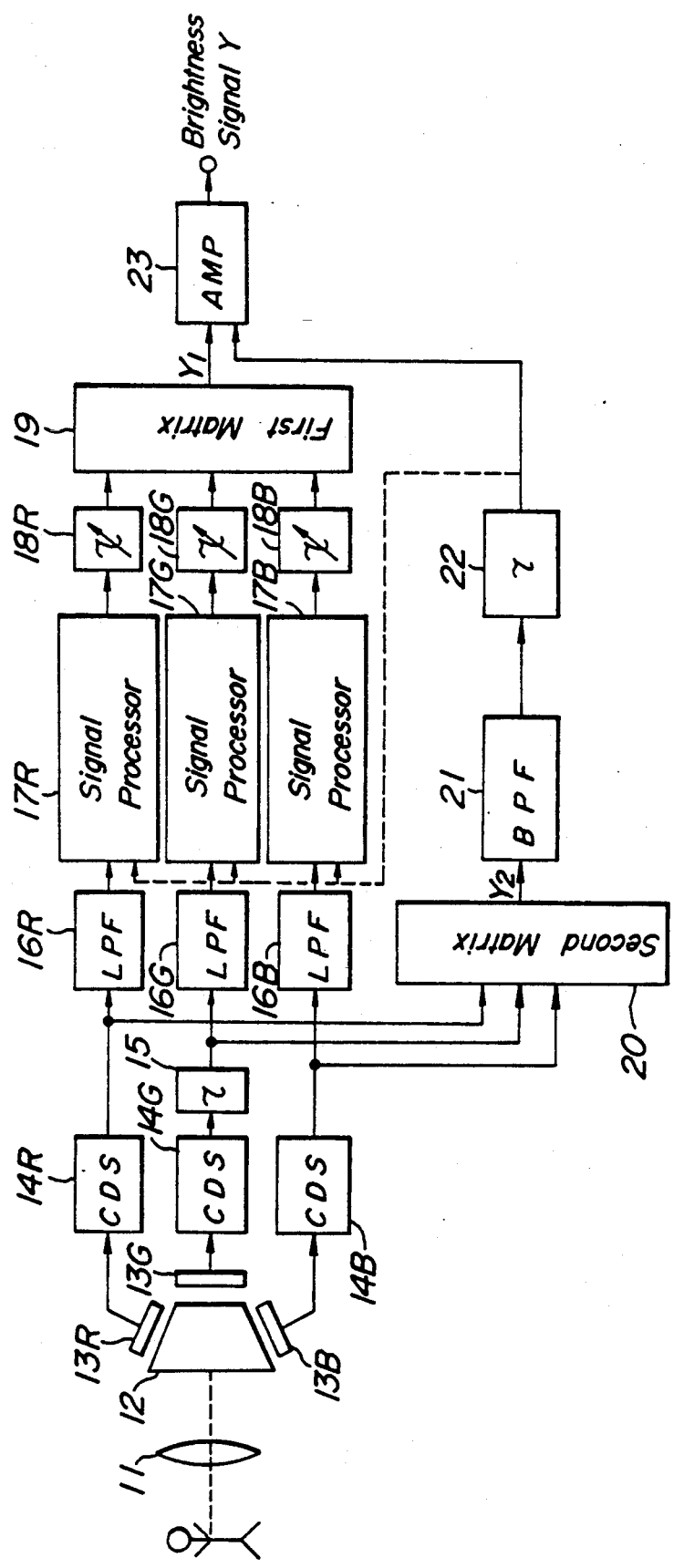

CIRCUIT FOR PRODUCING BRIGHTNESS SIGNAL FROM OUTPUT SIGNAL OF SOLID STATE IMAGE PICK-UP APPARATUS USING SPATIAL PIXEL SHIFT

BACKGROUND OF THE INVENTION

Field of the Invention and Related Art Statement

The present invention relates to a circuit for producing a brightness signal from an output signal of a solid state image pick-up apparatus, in which at least two solid state image sensor each having a number of light receiving elements arranged in matrix are arranged in such a manner that light receiving elements of one solid state image sensor are shifted spatially in a main-scanning direction over a distance substantially equal to one-half of the pitch of successive light receiving elements with respect to light receiving elements of other solid state image sensor.

In a solid state image sensor, each of the light receiving elements constituting pixels are existent independently from each other and a sample signal is obtained spatially. Therefore, the maximum spatial frequency which can be reproduced by a single solid state image sensor is limited to $f_c/2$ in accordance with the Nyquist sampling theory, wherein $f_c$ is the horizontal clock frequency. When a frequency range higher than the maximum spatial frequency $f_c/2$ is obtained, a higher frequency component is folded back toward a lower frequency range, which results in a spurious signal. In order to obtain a higher resolution without producing the spurious signal component, in a color television camera using three solid state image sensors, light receiving elements of a green image sensor are spatially shifted in the main-scanning direction, i.e. horizontal scanning direction with respect to light receiving elements of red and blue solid state image sensors over a distance which is substantially equal to the pitch of an arrangement of the light receiving elements viewed in the horizontal scanning direction. Such a method is usually called a spatial pixel shift.

FIG. 1A is a schematic view showing a known color television camera using the above explained spatial pixel shift. As illustrated in FIG. 1A, an image of an object is formed by an objective lens 1 and is divided by a three-color splitting optical system 2 into three primary color images, i.e. red, green and blue images. These color images are made incident upon solid state image sensors 3R, 3G and 3B, respectively. As depicted in FIG. 1B, pixels of the solid state image sensor 3G receiving the green image are spatially shifted in the horizontal direction with respect to pixels of the solid state image sensors 3R and 3B for receiving the red and blue images, respectively over a distance which is equal to a half of a pitch P of the pixels viewed in the horizontal direction. By using the spatial pixel shift method, the spatial sampling is carried out such that successive pixels of the red and blue image sensors 3R and 3B are situated between successive pixels of the green image sensor 3G (FIG. 1C). When the brightness signal is formed by adding the green, red and blue signals to each other, the number of pixels is apparently increased, and thus the resolution is improved, while the spurious component folded back into the lower frequency range can be reduced.

FIG. 2 is a block diagram showing a known circuit for producing a brightness signal from the red, green and blue color signals generated by the red, green and blue image sensors 3R, 3G and 3B, respectively of the color television camera using the spatial pixel shift. The red, green and blue color signals are supplied to correlation double sampling circuits 4R, 4G and 4B, respectively, and then the green color signal is delayed by a delay circuit 5 having a delay time which is equal to one-half of the sampling period, so that the phase of the green color signal is made coincident with the phase of the red and blue color signals. It should be noted that said sampling period corresponds to the pitch of light receiving elements of the image sensors 3R, 3G and 3B viewed in the horizontal scanning direction. Then, the red, green and blue color signals having the coincided phase are supplied to low pass filters 6R, 6G and 63 which cut off frequency components higher than the sampling frequency to remove sampling clock noise. Further, the red, green and blue color signals are supplied to image signal processing circuits 7R, 7G and 7B, respectively which perform amplitude compression and $\gamma$ correction. Finally, the red, green and blue color signals are supplied to a matrix circuit 8 and are mixed with each other at a predetermined ratio to derive the brightness signal. In accordance with the NTSC standards; the red, green and blue color signals are added to each other at a ratio of 0.3:0.59:0.11. The derived brightness signal is amplified by an amplifier 9 and then is supplied to an output terminal of the television camera. Since the spatial pixel shift is utilized, the spurious signal folded back toward the lower frequency range which might deteriorate the quality of the reproduced color image is reduced and the resolution of the brightness signal is apparently improved.

In the known color television camera, the phase of the green color signal is delayed with respect to the red and blue color signals by passing the green color signal through the delay circuit 5 having the delay time corresponding to ½ P. However, the color signals are processed by the low pass filters 6R, 6G, 6B and image signal processing circuits 7R, 7G, 7B which also cause time delays in the color signals. Therefore, the phases of the red, green and blue color signals are not made identical to match each other precisely and the resolution of the brightness signal is decreased.

Further, in order to attain an improvement in the resolution by utilizing the spatial pixel shift, the circuits provided between the color image sensors 3R, 3G, 3B and the matrix circuit 8 must have frequency characteristics which can process signals having frequencies sufficiently higher than the clock frequency of the solid state image sensors.

When an object having a pattern having a repetitive pitch substantially equal to the pixel pitch as shown in FIG. 3A is picked-up by the known television camera and the solid state image sensors are read out by the clock illustrated in FIG. 3B, the green color signal is delayed with respect to the red and blue color signals by the time corresponding to a half of the pixel pitch. FIG. 3C shows the green color signal before being processed by the low pass filter 6G and FIG. 3D illustrates the red or blue color signal R or B before being transmitted through the low pass filter 6R or 6B. When these ideal color signals are mixed in the matrix circuit 8, there is derived an ideal brightness signal Y depicted in FIG. 3E. However, in practice, the low pass filters 6R, 6G and 6B have frequency characteristics such that the higher frequency component is suppressed in order to remove the clock noise. Further the image signal processing circuits 7R, 7G and 7B could hardly derive the ideal color signals shown in FIGS. 3C and 3D. Therefore, the higher frequency components of the actual green, red and blue color signals G',R' and B' obtained after being transmitted through the low pass filters 3G, 3R and 3B and image signal processing circuits 7G, 7R and 7B are suppressed as illustrated in FIGS. 3F and 3G. As a result, the frequency response of the actual brightness signal Y' is reduced to a large extent as shown in FIG. 3H.

In the spatial pixel shift, it is ideal to mix color signals at a ratio of 1:1. However, in the known color television camera using the spatial pixel shift, the green and red color signals are added to each other at a ratio of 2:1 and the green and blue color signals are mixed with each other at a ratio of 6:1. Therefore, the effect of the spatial pixel shift could not be achieved fully and the spurious signal could not be sufficiently removed and thus the resolution of the reproduced image is reduced.

SUMMARY OF THE INVENTION

The present invention has for its object to proved a novel and useful circuit for deriving the brightness signal from the output signals of the color image sensors of the color television camera using the spatial pixel shift, in which the effect of the spatial pixel shift can be attained optimally and the resolution and frequency response of the brightness signal can be improved.

According to the invention, a circuit for producing a brightness signal from an output signal of a solid state image pick-up apparatus, in which at least two solid state image sensors each having a number of light receiving elements arranged in matrix are arranged in such a manner that light receiving elements of one solid state image sensor are shifted spatially in a main-scanning direction over a distance substantially equal to one-half of the a pitch of successive light receiving elements with respect to light receiving elements of the other solid state image sensor, comprises:

delaying means for delaying an output signal generated by said one solid state image sensor by a delay time corresponding to one-half of a spatial sampling period so that the phase of the output signal of said one solid state image sensor is made coincide with the phase of an output signal of said other solid state image sensor;

first filtering means for cutting off higher frequency components contained in an output signal of said delaying means and in the output signal of said other solid state image sensor;

signal processing means for processing output signals of said first filtering means;

first matrix means for adding output signals of said signal processing means to each other at a predetermined ratio to produce a first brightness signal;

second matrix means for adding the output signal of said delaying means and the output signal of said other solid state image sensor to each other at a ratio of 1:1 to derive a second brightness signal;

second filtering means for extracting a high frequency component from said second brightness signal; and adding means for adding said high frequency component derived by said second filtering means to said first brightness signal.

In the brightness signal producing circuit according to the invention, the second brightness signal is formed by mixing the output signals which are not processed by the first filtering means and signal processing means which might reduce the resolution and frequency response at the ratio of 1:1 at which the effect of the spatial pixel shift can be attained optimally. Then, the frequency component of the second brightness signal higher than a frequency range predetermined by a television standard system is extracted from the second brightness signal and the thus extracted higher frequency component is added to the first brightness signal. Therefore, when an object having a high spatial frequency is picked-up, it is possible to derive a brightness signal having a very high resolution and frequency response, while the effect of the spatial pixel shift can be achieved optimally.

BRIEF DESCRIPTION OF THE DRAWINGS

FIGS. 1A, 1B and 1C are schematic views showing the construction of the known color television camera using the spatial pixel shift;

FIG. 2 is a block diagram illustrating a known circuit for producing the brightness signal in the color television camera using the spatial pixel shift;

FIGS. 3A to 3H are signal waveforms for explaining the operation of the known brightness signal producing circuit shown in FIG. 2; and FIG. 4 is a block diagram depicting an embodiment of the brightness signal producing circuit according to the invention.

DESCRIPTION OF THE PREFERRED EMBODIMENTS

FIG. 4 is a block diagram showing an embodiment of the circuit for producing a brightness signal from output signals generated by a color television camera using the spatial pixel shift. An image of an object is formed by an objective lens 11 and is divided into three primary color images by means of a color splitting optical system 12. The red, green and blue color images are then made incident upon red, green and blue solid state image sensors 13R, 13G and 13B, respectively to generate red, green and blue color signals. These color signals are then supplied to correlate double sampling circuits 14R, 14G and 14B, respectively and are sampled therein in accordance with a predetermined sampling clock. The green color signal is then delayed by a delay circuit 15 by a delay time which corresponds to one-half of the pitch of the arrangement of light receiving elements viewed in the horizontal scanning direction. In this manner, the phase of the green color signal is made to coincide with the phase of the red and blue color signals.

The red, green and blue color signals are then supplied to low pass filters 16R, 16G and 16B, respectively to remove the sampling clock noise. Then output color signals from the low pass filters 16R, 16G and 16B are further processed by image signal processing circuits 17R, 17G and 17B, respectively to effect various functions such as γ correction and amplitude compression. Output signals from the image signal processing circuits 17R, 17G and 17B are supplied to variable delay circuits 18R, 18G and 18B, respectively to correct differences in the phases of the color signals. Then, output signals of the variable delay circuits 18R, 18G and 18B are supplied to a first matrix circuit 19 and are mixed with each other at a ratio which has been determined by the television standard to derive a first brightness signal $Y_1$. In the NTSC system, the red, green and blue color signals are mixed with each other at a ratio of 0.3:0.59:0.11.

The construction so far explained is the same as that of the known brightness signal producing circuit. According to the invention, the red and blue color signals derived from the correlate double sampling circuits 14R and 14B and the green color signal derived from the delay circuit 15 are supplied to a second matrix circuit 20 and are mixed with each other at a ratio of 1:1 to produce a second brightness signal $Y_2$. That is to say, the red, green and blue color signals R, G and B are mixed at the following ratio:

R:G:B=0.25:0.5:0.25.

In this connection, it should be noted that according to the invention, the ratio of the sum of the color signals generated by the image sensors in which the spatial pixel shift has taken place and the sum of the color signals of the image sensors in which the spatial pixel shift is not effected becomes 1:1. Therefore, in the present embodiment, the green color signal is equal to the sum of the red and blue color signals.

The second brightness signal derived from the second matrix circuit 20 is then supplied to a band pass filter 21 for extracting a higher frequency component in the second brightness signal, said higher frequency component being higher than the predetermined maximum frequency of the first brightness signal which has been derived by mixing the color signals at the predetermined ratio. The higher frequency component thus extracted is then supplied to a delay circuit 22 giving a given delay time for correcting a possible difference in the delay time between the first brightness signal $Y_1$ and the second brightness signal $Y_2$. Finally, the first brightness signal $Y_1$ generated from the first matrix circuit 19 and the second brightness signal $Y_2$ derived from the delay circuit 22 are supplied to an adding amplifier 23 and are added to each other to derive a final brightness signal Y.

In the present invention, the higher frequency component contained in the final brightness signal Y is obtained by mixing the color signals at a the ratio which is different from the television standard. However, in the television standard, there is no condition for the higher frequency component, so that there would occur any problem. The difference in the delay times of the color signals in the low pass filters 16R, 16G, 16B and image signal processing circuits 17R, 17G, 17B can be corrected by adjusting the variable delay circuits 18R, 18G, 18B. Therefore, when there is not produced any delay time difference in these circuits, the variable delay circuits may be dispensed with. The delay time in the delay circuit 22 may be determined by considering the delay times in the low pass filters, image signal processing circuits, variable delay circuits, second matrix circuit and band pass filter. By providing the variable delay circuits 18R, 18B and delay circuit 22, it is possible to produce a the brightness signal Y having a very high resolution and frequency response without being affected by the small difference in phase, so that the effect of the spatial pixel shift can be attained optimally.

The present invention is not limited to the embodiment just explained above, but many modifications and alternations may be conceived by those skilled in the art within the scope of the invention. For instance, when the phase difference induced by the image signal processing circuits 17R, 17G and 17B is very small and these circuits can process the higher frequency components, the higher frequency component derived from the delay circuit 22 may be parallelly supplied to the image signal processing circuits 17R, 17G and 17B as shown by broken lines in FIG. 4. Further in the above embodiment, the second brightness signal $Y_2$ is formed by mixing all the color signals, but according to the invention, the second brightness signal may be produced by mixing the green and red color signals or the green and blue color signals. In this case, the green color signal and the red or blue color signals are mixed with each other at a ratio of G:R or B=0.5:0.5.

As explained above in detail, in the brightness signal producing circuit according to the invention, the color signals which have not been transmitted through the low pass filters and signal processing circuits are supplied to the second matrix circuit and the color signals generated from the image sensors in which the spatial pixel shift is performed are mixed with each other at the ratio of 1:1 to derive the second brightness signal, and then the higher frequency component is extracted from the second brightness signal and the thus extracted higher frequency component is added to the first brightness signal which has been derived by mixing the color signals at the ratio which is predetermined by the television standard. Therefore, the second brightness signal does not suffer from the difference in the delay time in the low pass filters and signal processing circuits, and thus the reduction of the resolution due to the difference in the delay time can be removed. Further, the second brightness signal is not affected by the frequency band limitation and deterioration in the frequency characteristic, and therefore deterioration in the resolution and frequency response can be avoided. Moreover, the second brightness signal is formed by mixing the color signals at the ratio of 1:1 regardless of the television standard, and the effect of the spatial pixel shift can be always attained optimally.

What is claimed is:

1. A circuit for producing a brightness signal from output color signals of a solid state image pick-up apparatus, in which at least two solid state image sensor s each having a number of light receiving elements arranged in matrix are arranged in such a manner that light receiving elements of one solid state image sensor are shifted spatially in a main-scanning direction over a distance substantially equal to one-half of a pitch of successive light receiving elements with respect to light receiving elements of the other solid state image sensor, comprising:

delaying means for delaying an output signal generated by said one solid state image sensor by a delay time corresponding to one-half of a spatial sampling period so that a phase of the output signal of said one solid state image sensor is made to coincide with a phase of an output signal of said other solid state image sensor;

first filtering means for cutting off higher frequency components contained in an output signal of said delaying means and in the output signal of said other solid state image sensor;

signal processing means for processing output signals of said first filtering means;

first matrix means for adding output signals of said signal processing means to each other at a predetermined ratio to produce a first brightness signal;

second matrix means for adding the output signal of said delaying means and the output signal of said other solid state image sensor to each other at a ratio of 1:1 to derive a second brightness signal;

second filtering means for extracting a high frequency component from said second brightness signal; and adding means for adding said high frequency component derived by said second filtering means to said first brightness signal.

2. A circuit according to claim 1, wherein said adding means comprises a connecting means for supplying said higher frequency component to said signal processing means.

3. A circuit according to claim 1, further comprising variable delay means arranged between said signal processing means and said first matrix means for adjusting the phase of the color signals.

4. A circuit according to claim 1, further comprising a delay circuit for delaying said higher frequency component.

5. A circuit according to claim 1, wherein said adding means comprises an adding amplifier for adding said higher frequency component to said first brightness signal supplied by said first matrix means.

6. A circuit according to claim 5, further comprising variable delay means arranged between said signal processing means and said first matrix means for adjusting the phase of the color signals.

7. A circuit according to claim 5, further comprising a delay circuit for delaying said higher frequency component.

8. A color television camera comprising:
an objective lens for forming an image of an object to be picked-up;
a color separating optical system for separating said image of the object into red, green and blue color images;
a red solid state image sensor having a number of light receiving elements arranged in matrix for receiving said red color image to derive a red color signal;
a blue solid state image sensor having a number of light receiving elements arranged in matrix for receiving said blue color image to derive a blue color signal;
a green solid state image sensor having a number of light receiving elements arranged in matrix for receiving said green color image to derive a green color signal, said light receiving elements being shifted in the horizontal scanning direction with respect to those of said red and blue solid state image sensors over a distance which is equal to one-half of a pitch of the arrangement of the light receiving elements in the horizontal scanning direction;
a red correlate double sampling circuit for sampling said red color signal to derive a sampled red color signal;
a green correlate double sampling circuit for sampling said green color signal to derive a sampled green color signal;
a blue correlate double sampling circuit for sampling said blue color signal to derive a sampled blue color signal;
a first delay circuit for delaying the sampled green color signal generated by said green correlate double sampling circuit by a delay time which corresponds to one-half of a pitch of the arrangement of the light receiving elements viewed in the horizontal scanning direction to derive a delayed green color signal;
a red low pass filter for removing a higher frequency component of said sampled red color signal generated by said red correlate double sampling circuit to derive a filtered red color signal;
a blue low pass filter for removing a higher frequency component of said sampled blue color signal generated by said blue correlate double sampling circuit to derive a filtered blue color signal;
a green low pass filter for removing a higher frequency component of said delayed green color signal generated by said first delay circuit to derive a filtered green color signal;
a red color signal processing circuit for processing said filtered red color signal to derive a processed red color signal;
a green color signal processing circuit for processing said filtered green color signal to derive a processed green color signal;
a blue color signal processing circuit for processing said filtered blue color signal to derive a processed blue color signal;
a first matrix circuit for mixing said filtered red, green and blue color signals supplied from said red, green and blue color signal processing circuits, respectively with each other at a first ratio to derive a first brightness signal;
a second matrix circuit for mixing said red sampled color signal generated by said red correlate double sampling circuit, the delayed green color signal generated by said first delay circuit, and said blue sampled color signal generated by said blue correlate double sampling circuit at a ratio of 0.25:0.5:0.25 to derive a second brightness signal;
a band pass filter for extracting a higher frequency component of said second brightness signal; and
an adding amplifier for adding said higher frequency component to said first brightness signal to derive a final brightness signal.

9. A color television camera according to claim 8, further comprising
a red variable delay circuit for adjusting a phase of said processed red color signal;
a green variable delay circuit for adjusting a phase of said processed green color signal;
a blue variable delay circuit for adjusting a phase of said processed blue color signal.

10. A color television camera according to claim 9, further comprising a second delay circuit for adjusting a phase of said higher frequency component of the second brightness signal.

11. A color television camera according to claim 10, wherein said first matrix circuit is constructed to mix the processed red, green and blue color signals with each other at a ratio of 0.30:0.59:0.11.

* * * * *